Figure 1:
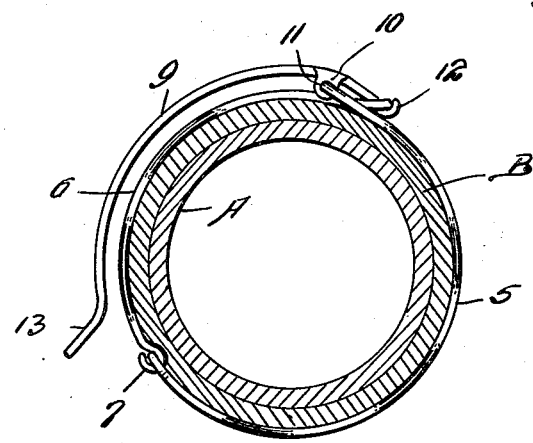

Feb. 5, 1924. 1,483,050

E. D. WELLS

HOSE CLAMP

Filed Feb. 13, 1923   2 Sheets-Sheet 1

Witnesses:
F. L. Fox.
H. Berman

E. D. Wells,
Inventor

Attorney

Feb. 5, 1924.
E. D. WELLS
1,483,050
HOSE CLAMP
Filed Feb. 13, 1923
2 Sheets-Sheet 2
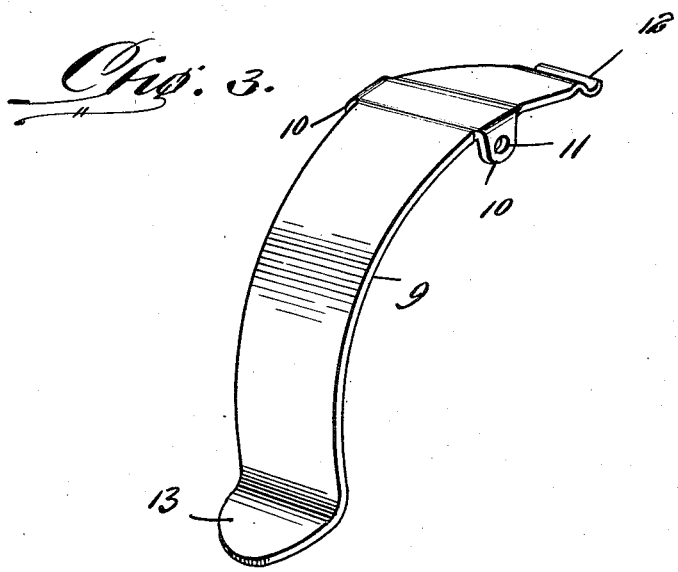
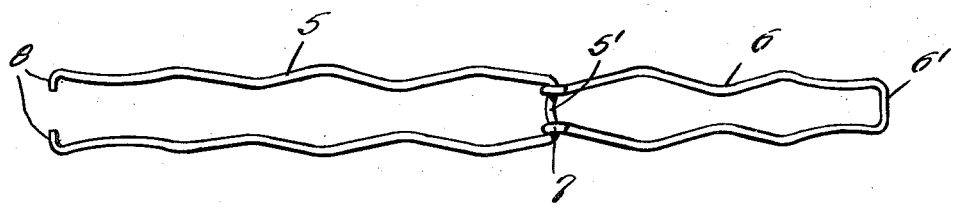

Patented Feb. 5, 1924.

1,483,050

UNITED STATES PATENT OFFICE.

ERNEST D. WELLS, OF ATLANTA, GEORGIA, ASSIGNOR OF ONE-HALF TO STILES HOPKINS, OF ATLANTA, GEORGIA.

HOSE CLAMP.

Application filed February 13, 1923. Serial No. 618,804.

*To all whom it may concern:*

Be it known that I, ERNEST D. WELLS, a citizen of the United States, residing at Atlanta, in the county of Fulton and State of Georgia, have invented certain new and useful Improvements in Hose Clamps, of which the following is a specification.

My invention relates to improvements in hose clamps, and the primary object thereof resides in the provision of such a device that is extremely simple of construction, comparatively inexpensive of manufacture and such a clamp that may be readily applied for clamping the hose upon a pipe in a simple and expeditious manner.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1—is a cross sectional view of a pipe showing one end of a hose secured thereon, through the instrumentality of a hose clamp constructed in accordance with the present invention.

Figure 2:
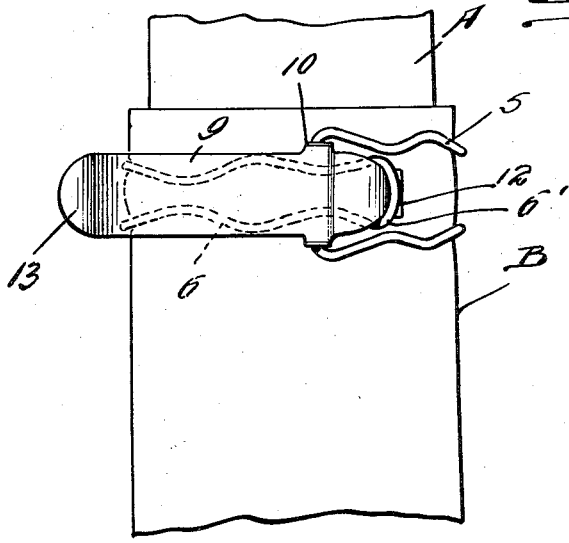

Figure 2—is a fragmentary top plan view of a hose clamped upon one end of a pipe, also through the instrumentality of my improved form of hose clamp.

Figure 3—is a perspective view of the locking lever forming a part of this clamp, and Figure 4—is a plan view of a pair of clamping members forming a part of my invention, and before the same have been bent into their proper shape.

With reference to the drawings, and particularly Figures 1 and 2, there is shown a metallic pipe A adapted to have secured upon one end thereof, one end of a rubber hose B, these two figures clearly disclosing my improved form of hose clamp positioned thereon.

The clamp per se constitutes the provision of a pair of hose engaging members 5 and 6. Each of these members are formed of a single length of steel wiring or the like, and bent into substantially elongated U shape, the width and length of the members 5 being relatively greater than the similar dimensions of the member 6. The ends of the legs of the member 6 are hooked as at 7 for engaging over the adjacent connecting portion 5' of the longer member 5, and it is to be noted that the side legs forming each of these members 5 and 6 are corrugated for the purpose of resiliency.

These members 5 and 6 are bent into arcuate form as shown in Figures 1 and 2, and loosely, pivotally connected to the inwardly bent ends 8 of the legs constituting the relatively large member 5 is an arcuate shaped locking lever 9. Adjacent the front end of this lever, the same is formed upon opposite edges thereof with downwardly bent ears 10, each having an opening 11 therein for receiving the said inwardly bent ends 8 of the legs constituting the member 5.

The extreme front end of the locking lever 9 is formed transversely with a curved lip or hook 12, and in the practical application of my hose clamp, the members 5 and 6 are positioned upon a pipe, and the curved lip or hook 12 engages the connecting portion 6' of the member 6 and is then depressed into position shown in Figures 1 and 2 for drawing this end of the member 6 through the adjacent end of the member 5 for effectively clamping the said rubber hose B upon the metallic pipe A.

I have shown the locking lever 9 being formed at its outer end with a thumb engaging portion 13 and whilst I have herein shown and described the preferred embodiment of the present invention, it is nevertheless to be understood that minor changes may be made therein, without departing from the spirit and scope of the invention as claimed.

What I claim as new is:—

A hose clamp comprising arcuate members formed from resilient wire and having crimped side portions said members being pivotally connected together, a longitudinally curved locking plate provided at its side edges and at a point between its ends which are disposed within the concaved side of the plate, one of the arcuate members having the ends of its side portions pivotally engaged in the gears, the plate being provided at one end with a concaved lip adapted to engage in the end of the other arcuate member, the parts being so arranged that when the device is applied to a hose section and the locking member is closed, the said part will lie in close proximity to the exterior surface of the hose.

In testimony whereof I affix my signature.

ERNEST D. WELLS.